(12) United States Patent
Fokle Kokou et al.

(10) Patent No.: US 11,943,612 B2
(45) Date of Patent: Mar. 26, 2024

(54) METHOD AND NETWORK SERVER FOR AUTHENTICATING A COMMUNICATION APPARATUS

(71) Applicant: THALES DIS FRANCE SAS, Meudon (FR)

(72) Inventors: Milas Fokle Kokou, Meudon (FR); Jean-Yves Fine, Meudon (FR); Michel Anslot, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 294 days.

(21) Appl. No.: 17/293,700

(22) PCT Filed: Nov. 13, 2019

(86) PCT No.: PCT/EP2019/081222
§ 371 (c)(1),
(2) Date: May 13, 2021

(87) PCT Pub. No.: WO2020/099506
PCT Pub. Date: May 22, 2020

(65) Prior Publication Data
US 2022/0014909 A1    Jan. 13, 2022

(30) Foreign Application Priority Data

Nov. 13, 2018   (EP) ..................... 18306485

(51) Int. Cl.
*H04L 29/00*     (2006.01)
*H04W 12/041*    (2021.01)
(Continued)

(52) U.S. Cl.
CPC ......... *H04W 12/06* (2013.01); *H04W 12/041* (2021.01); *H04W 12/71* (2021.01); *H04W 12/72* (2021.01)

(58) Field of Classification Search
CPC ... H04W 12/06; H04W 12/041; H04W 12/71; H04W 12/72; H04W 12/043
See application file for complete search history.

(56) References Cited

U.S. PATENT DOCUMENTS 11,336,445 B2 *  5/2022  Anslot ................. H04L 9/0891
11,496,311 B2 * 11/2022  Gallagher .......... G06Q 30/0226
(Continued)

FOREIGN PATENT DOCUMENTS

WO    WO-2018096311 A1 *  5/2018  ......... H04L 63/0823
WO    WO2018096311 A1     5/2018

OTHER PUBLICATIONS

PCT/EP2019/081222, International Search Report, dated Jan. 28, 2020, European Patent Office, P.B. 5818 Patentlaan 2 NL—2280 HV Rijswijk.

*Primary Examiner* — Jeffrey C Pwu
*Assistant Examiner* — Helai Salehi

(57) ABSTRACT

A method for authenticating by a network server a communication apparatus, the communication apparatus contains a tamper resistant area adapted to memorize a first secret, by receiving from the communication apparatus a request message including a subscriber identifier; providing, by consulting a database accessible by the network server, a device identifier associated to the received subscriber identifier allowing to identify the communication apparatus; identifying in a secure distributed ledger a record published by a manufacturer of at least a portion of the communication apparatus, the record including a second secret attributed to the identified communication apparatus; generating a challenge message including a random number and sending it to the communication apparatus for it to generate a first result; receiving from the communication apparatus a response message including the first result, the communication appa- (Continued)

ratus being authenticated by the network server if the first result is equal to a second result.

25 Claims, 2 Drawing Sheets

(51) Int. Cl.
*H04W 12/06* (2021.01)
*H04W 12/71* (2021.01)
*H04W 12/72* (2021.01)

(56) References Cited

U.S. PATENT DOCUMENTS

| | | | |
|---|---|---|---|
| 2013/0036223 | A1 | 2/2013 | Du et al. |
| 2019/0228407 | A1* | 7/2019 | Wu ........................ H04L 9/0637 |
| 2019/0317964 | A1* | 10/2019 | O'Brien .............. G06F 16/9035 |
| 2021/0058250 | A1* | 2/2021 | Anslot .................. H04W 12/71 |

* cited by examiner

METHOD AND NETWORK SERVER FOR AUTHENTICATING A COMMUNICATION APPARATUS

TECHNICAL FIELD

The present invention relates to a method and apparatus for authenticating a communication apparatus. It is applicable to the technical domain subscription modules implemented in hardware and/or software.

BACKGROUND OF THE INVENTION

A Subscriber Identity Module (SIM) is an application providing secure, identifiable and authenticated access to wireless networks. Since its inception in the early 1990's to the present day, it is implemented as a smart card which provides secure, identifiable and authenticated access to wireless networks. This smart card is designated as a SIM card when containing the SIM application and more generally as a universal integrated-circuit card (UICC). A UICC is able to contain several applications such as a SIM application or a universal subscriber identity module application (USIM). The UICC is also the primary piece of operator supplied equipment used by consumers when connecting to the wireless network.

There are now alternatives to the UICC cards implementing one or several subscription modules. These are designated as virtual SIM (vSIM) or software SIM (softSIM) where the functionalities of the one or several subscription modules are carried out by a software layer. A traditional UICC card is tamper resistant by definition but a virtual SIM do not have this property without costly environment. If the credentials are extracted from the virtual SIM, clones can be easily generated.

Therefore, there is a need for a technology which is lowering the consequences of the cloning of a subscriber module.

An existing technology for detecting a communication apparatus embedding a cloned subscription module is described in the specification of the European patent application number 17306942.8 entitled "A method for updating a one-time secret key". The proposed technology is designed for updating a secret key Kn maintained in a subscription module implemented in the communication apparatus. A wireless communication network maintains an identical version of said secret key Kn and is configured to determine a result XRES expected from the communication apparatus when an authentication function is applied by the subscription module using a random challenge and the secret key Kn as an input. This method comprises several steps.

First, the communication apparatus receives from the communication network an authentication request message containing at least a random challenge RANDn.

Then, the subscription module determines a result RES by applying the authentication function using the random number RANDn and the secret key Kn as inputs.

Result RES is then transmitted to the communication network for it to be compared with the expected result XRES determined by the communication network using the random number RANDn and the corresponding version of the secret key Ki,n.

The subscriber is then authenticated if said first and second results are matching.

Once the subscriber is authenticated, the secret key Kn is updated by replacing its current version with a new version. This new version is obtained by applying a first key derivation function using the random challenge RANDn as an input.

The updated version of the secret key is used by the subscription module for processing a subsequent authentication request, the same update being carried out by a server accessible by or part of the wireless communication network with the aim of maintaining an identical version of secret key Kn.

Using this existing technology enables to detect if a subscription module and/or the communication apparatus embedding the subscription module is cloned by a fraudster to access to a given communication network. Authentication failures of the cloned device or the one operated by the legitimate device will be detected due to the fact that the one-time secret key Kn maintained by the cloned and the legitimate subscription module user will diverge just after the first successful authentication following the cloning. In that case, the legitimate user can be requested by the wireless network operator to provide a secret credential in order to implement a further layer of authentication and the subscription module embedded in the communication apparatus hold by the legitimate user can be updated accordingly.

One limitation of this existing technology is that the network is not able to distinguish the device operated by the legitimate user embedding the genuine subscription module from the one embedding the cloned subscription module. It is only able to detect the subscription module has been cloned which make difficult for the associated wireless network operator to take appropriate action.

SUMMARY OF THE INVENTION

The invention relates to a method for authenticating by a network server a communication apparatus, the communication apparatus comprising a tamper resistant area adapted to memorize a first secret, the network server being configured to communicate with the communication apparatus through a wireless network and to read at least one data element memorized in a secure distributed ledger, the method comprising the steps of:
  receiving from the communication apparatus a request message comprising a subscriber identifier;
  providing, by consulting a database accessible by the network server, a device identifier associated to the received subscriber identifier allowing to identify the communication apparatus;
  identifying in the secure distributed ledger, using the device identifier, a record published by a manufacturer of at least a portion of the communication apparatus, said record comprising a second secret attributed to the identified communication apparatus;
  generating a challenge message comprising a random number RAND and sending it to the communication apparatus for it to generate a first result F_HWRES derived from the first secret and the random number RAND;
  receiving from the communication apparatus a response message comprising the first result F_HWRES, the communication apparatus being authenticated by the network server if the first result F_HWRES is equal to a second result S_HWRES derived by the network server from the second secret and the random number RAND, which demonstrates that the first secret is equal to the second secret.

According to an example, the subscription identifier is an IMSI.

According to an example, the device identifier is an IMEI.

According to an example, the first secret is a master key that is used to derive a first hardware diversification key F_HWDK.

According to an example, the second secret is a master key KMF memorized in the secure distributed ledger record published by a manufacturer MANUF of at least a portion of the communication apparatus.

According to an example, the first and second secret are respectively a first F_HWDK and a second S_HWDK diversification keys.

According to an example, the method comprises the step of identifying the manufacturer MANUF of the electronic circuit using the unique device identifier in order to ease the access to the second hardware diversification key S_HWDK memorized in the secured distributed ledger.

According to an example, the request message is a 3GPP attachment request message comprising an IMSI.

According to an example, the method comprises the step of identifying the one or several algorithms used for determining the first F_HWDK and second S_HWDK hardware diversification keys, said algorithm being identified or memorized by in the record published by the manufacturer in the secure distributed ledger.

According to an example, the device authentication is triggered once the subscriber operating the communication device is successfully authenticated when another device is already authenticated using the same subscriber identifier.

According to an example, the attempt to authenticate the communication device failed.

According to an example, the database in implemented in the network server.

The invention also relates to a network server implementing the method described above.

The invention also relates to a computer program product comprising instructions which, when the program is executed by a computer, cause the computer to carry out the steps of the method described above.

BRIEF DESCRIPTION OF THE DRAWINGS

Additional features and advantages of the invention will be more become more apparent by the following description with reference to accompanying drawings, in which.

DETAILED DESCRIPTION

Figure 1:
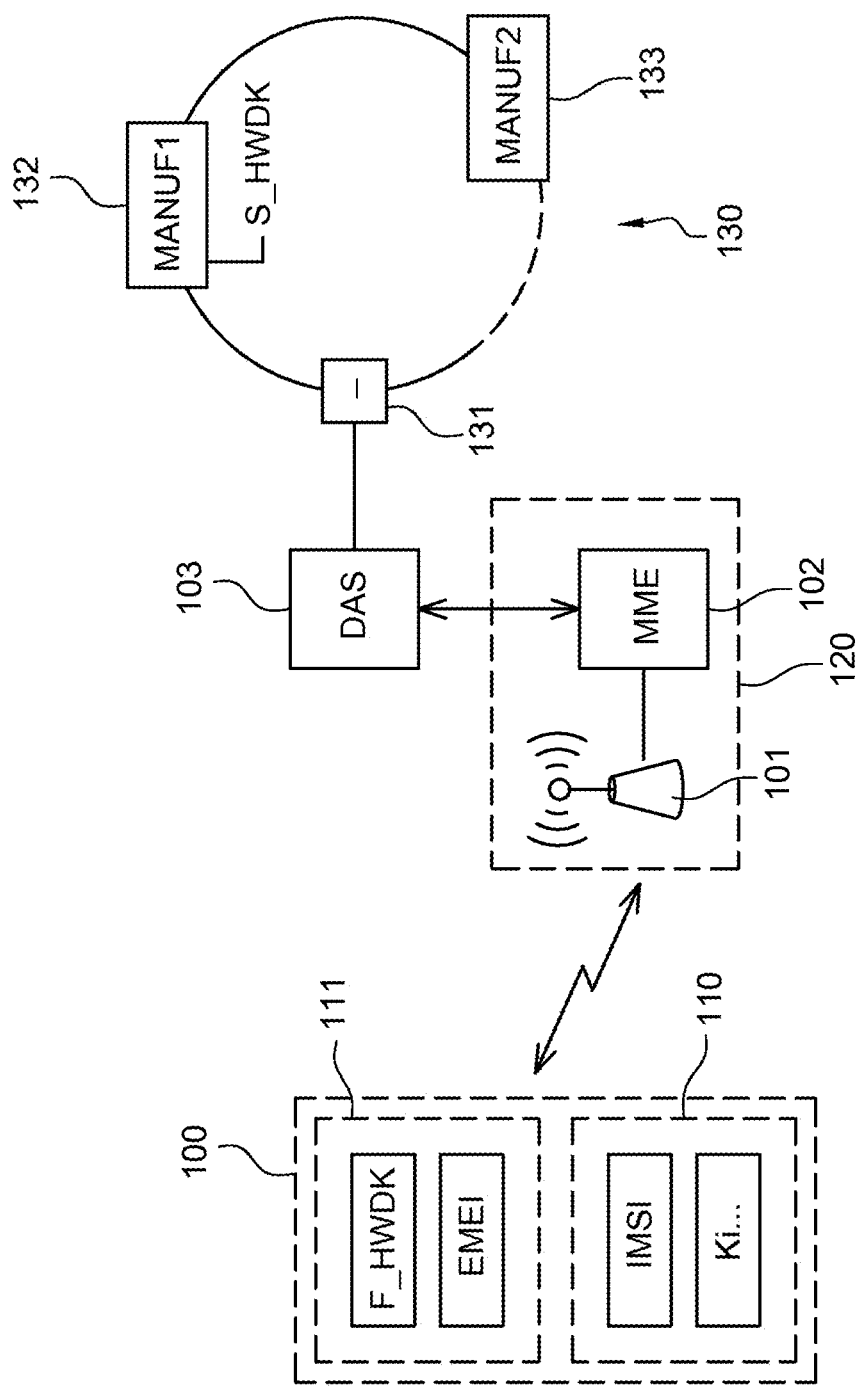
FIG. 1 is a simplified representation of a communication system allowing to authenticate a communication apparatus operated by an identified user.

FIG. 1 is a simplified representation of a communication system allowing to authenticate a communication apparatus operated by an identified user.

The system comprises a communication apparatus 100, that is to say a piece of equipment with communication capabilities and when needed, capacity of data capture, sensing, data storage, sensing and/or data processing.

The communication apparatus is for example a smartphone, a tablet computer or an IoT device. In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) module allowing transmission of data from one IoT device to another or exchange of data between machines through UMTS/HSDPA, CDMA/EVDO, LTE, 5G, LoRa or other networks.

The communication apparatus 100 embeds a subscription module 110. A subscription module is an entity implemented in software and/or hardware and comprising at least means for authenticating a subscriber in a communication network. The subscription module can be for example a Universal Integrated Circuit Card (UICC) comprising a SIM and a USIM application, an eUICC adapted to be provisioned with one or several subscription profile or a software SIM. The skilled person will understand that this list is non-limitative and that other types of subscription modules can also be advantageously used in conjunction with the invention.

The subscription module 110 memorizes at least one identifier of the subscriber, for example an International Mobile Subscriber Identity (IMSI). The subscription module 110 also memorizes one or several credentials needed for authenticating the subscriber by the network, such as a secret key Ki which is used in standard authentication algorithms such as AKA Milenage or COMP-128.

The communication apparatus 100 embeds at least an electronic circuit 111 capable of memorizing an identifier which can be used as an identifier of the communication apparatus 100. This identifier is preferably unique. According to an embodiment, this identifier is an International Mobile Equipment Identity (IMEI). Other types of identifier can also be used such as a unique device identifier (UDI) used to identify medical devices in the United States. A mobile equipment identifier (MEID) as defined in the 3GPP2 report S.R0048 can also be used, which can be seen as an IMEI but with hexadecimal digits.

The communication apparatus 100 also memorizes a hardware diversification key which is one important element for authenticating the apparatus. This hardware diversification key stored in the communication apparatus 100 is a secret key and is designated in the sequel as the first hardware diversification key F_HWDK.

According to a preferred embodiment, the first hardware diversification key F_HWDK is stored in a tamper resistant area of the communication apparatus 100.

According to another embodiment, the first hardware diversification key F_HWDK is not memorized permanently is derived from a secret stored in the communication apparatus 100. This secret is for example a master key KMF memorized in a tamper resistant area of the electronic circuit 111. In that case, the first hardware diversification key F_HWDK can be generated by the communication apparatus 100 when required.

The system as illustrated in FIG. 1 also comprises network elements 101, 102 complaint with a given radio communication technology. As an example, this radio communication technology is one of the Third Generation Partnership Project (3GPP) and can support 2G, 3G, 4G and 5G. The skilled person will understand that other alternative technologies can also be considered in the context of this invention such as WiFi or LoRa technologies as well as other technologies provided by other standards setting organizations (SSO) or non-standardized.

In the sequel, an LTE (Long Term Evolution) wireless network is taken as an example and the network comprises at least an eNode B 101 and a mobility management entity (MME) 102.

The system also comprises a device authentication server 103 also designated with the acronym DAS. This server 103 is able to access a database enabling to associate subscription identifiers with device identifiers. This database can be implemented in the DAS server or alternatively in another server allowing secure data exchanges with the DAS server.

More precisely, the database allows the device authentication server 103 to unambiguously retrieve a device identifier that is associated to a given subscription identifier. For example, if this authentication server 103 is provided with a subscription identifier of IMSI type, it will be capable of identifying an identifier of the communication apparatus embedding the subscription module provisioned with the receiver IMSI. The identifier of the communication apparatus is for example an IMEI or any other type of identifier allowing to identify a communication apparatus.

The device authentication server 103 is able to communicate through the wireless network 120 with the communication apparatus 100 embedding the subscription module 110 and the electronic circuit 111.

The device authentication server 103 is further configured to access a secure distributed ledger 130.

A secure distributed ledger SDL is a database which is consensually replicated, shared, and synchronized geographically across multiple sites, countries, or institutions. In addition, it is said secure because it is considered as impossible to modify data once memorized in the ledger. Therefore, data obtained by the device authentication server 104 by accessing the secure distributed ledger 130 can be trusted. The secure distributed ledger comprises continuously growing list of assertions or records and is often designated as immutable. An example of immutable distributed database is Blockchain.

The secure distributed ledger 130 is made of a plurality of nodes 131-133 which are configured to share and/or publish records in the database.

When a manufacturer produces an electronic circuit 111, it is able to publish in the secure distributed ledger 130 a record, also called assertion, comprising one or several data elements.

According to a preferred embodiment of the invention, this record comprises a hardware diversification key designated in this description as the second hardware diversification key S_HWDK and an identifier of the communication apparatus or of a circuit that is embedded in the communication apparatus.

These data elements contained in the secure distributed ledger 130 can be later used by the device authentication server to authenticate a given communication apparatus embedding the electronic circuit 111.

Figure 2:
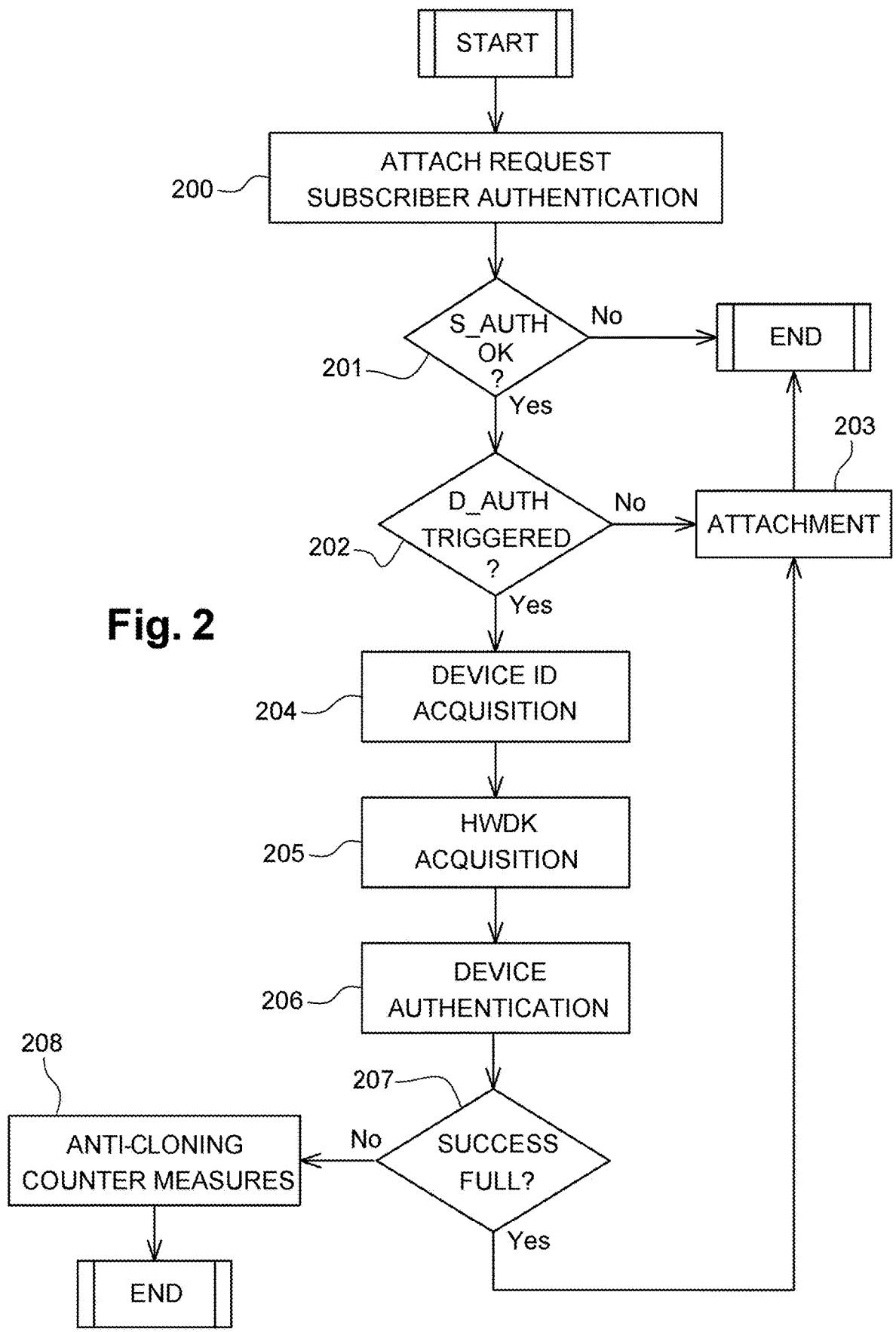
FIG. 2 provides an example of method allowing a wireless network operator to authenticate a communication apparatus.

FIG. 2 provides an example of method allowing a wireless network operator to authenticate a communication apparatus.

According to this example, a given communication apparatus associated to a given subscription sends an attachment request. This attachment request is received by the MME 102 of a wireless network operator, which is preferably the home operator of the subscriber. The attachment request comprises an identifier of the subscriber.

According to an embodiment, the attachment request is the standardized message as described in 3GPP specifications and allows the communication apparatus to send its IMSI as a subscription identifier.

For Universal Mobile Telecommunications Systems (UMTS) and Long Term Evolution (LTE) networks, this message is detailed in the 3GPP technical specifications 3GPP TS 24.008 "Mobile radio interface Layer 3 specification" and 3GPP TS 24.301 "Non-Access-Stratum (NAS) protocol for Evolved Packet System (EPS)".

The attachment message is processed by the wireless network 120 for authenticating 200 the subscriber. Authentication of the subscriber S_AUTH can be carried out using well known mechanism which are not described here.

According to an aspect of the invention, the wireless network 120 can trigger 202 a second authentication procedure once the subscriber has been successfully authenticated 201. The second authentication procedure can be triggered 202 for example when there is a suspicion that the correctly authenticated subscriber is in fact a fraudster using for example a cloned version of a soft SIM. This suspicion may arise when other authentication attempts which have been requested for the same subscriber failed, showing that there might be several devices trying to connect to the network using same subscriber identifier, some of them being operated by a malevolent person. The second authentication procedure is an authentication of the device D_AUTH.

Alternatively, the device authentication procedure D_AUTH can be triggered after failure of the subscriber authentication S_AUTH. According to another example, the device authentication can be trigger when it is detected that another communication apparatus is already attached to the network.

The skilled person will understand that the device authentication procedure can be triggered when the occurrence of a given event is detected, or on demand by the home mobile network operator MNO.

The subscriber authentication can fail for example if a soft SIM has been copied and installed in another communication apparatus. In case the subscriber authentication is based on a single-use secret updated by the network and the soft SIM after each successful authentication as described in the European patent application number 17306942.8, only one communication apparatus among the one embedding the genuine soft SIM and the one embedding the cloned soft SIM is able to be correctly authenticated, as the secret will be then updated by this communication apparatus and the network. Therefore, the other communication apparatus, which can be either the one with the genuine soft SIM or the cloned one, is not anymore synchronized with the network as their secrets are not anymore synchronized.

The device authentication D_AUTH aims at verify that the communication apparatus sending the attachment request is correctly associated to the subscriber.

Once the subscription identifier is received by the network in the attachment request, it is then transmitted by the MME 102 of the wireless network operator to the device authentication server 103 allowing the retrieval 201 of the device identifier to which is associated.

The device authentication server 103 then retrieves 204 in a database an identifier of a communication apparatus associated to the subscription identifier.

For that purpose, the device authentication server 103, comprises a database or has access to a database allowing him to make the link between a subscriber identifier, for example an IMSI and a device identifier, for example an IMEI. It is underlined once more that various types of subscription identifier and device identifiers can be used in the context of this invention.

Further, the method comprises the step of acquiring 205 by the device authentication server 103 from the secure distributed ledger 130 a hardware diversification key called second hardware diversification key S_HWDK with the purpose of authenticating the communication apparatus identified by the device identifier, or a chip or circuit embedded in the communication apparatus. According to an aspect of the invention, the second hardware diversification key S_HWDK is published in the secure distributed ledger 130 by the manufacturer of the electronic device.

According to an example, each chip maker, device maker or integrator can write in the distributed ledger an information element in order to identify itself. This information element is labelled MANUF in this description.

According to an alternative embodiment, the manufacturer can write in the secure distributed ledger 130 a master key KMF instead of the second hardware diversification key S_HWDK, said second hardware diversification key S_HWDK being derived from the master key KMF using a predetermined algorithm.

Further, the manufacturer can also write in the secure distributed ledger an information element designating which algorithm ALGO1 is to be used for determining the second hardware diversified key S_HWDK knowing a device serial number, for example its IMEI and/or a secret such as the aforementioned master key KMF.

According to another example, the device manufacturer can also write in the secure distributed ledger 132 an information element indicating which algorithm ALGO2 is used by the communication apparatus in case the first hardware diversification key F_HWDK needs to be derived from a secret and/or a device identifier or other data elements or parameters. This information can be later communicated to the communication device by the authentication server to determining locally the hardware diversification key to be used to enable the device authentication.

The authentication scheme implemented in this system aims at verifying that the communication apparatus used by the subscriber is authorized by its wireless network operator. For that purpose, it is verified that the communication apparatus is provisioned with a secret that is the same as the one published by the device manufacturer in the secure distributed ledger.

As underlined in the different embodiments presented above, this secret can be a hardware diversification key. In that case, the aim of the device authentication process is to verify that the first hardware diversification key F_HWDK is identical to second hardware diversification key S_HWDK. In other words, it is verified during the device authentication process that the hardware diversification key memorized in the communication apparatus is that same as the one published by the device manufacturer in the secure distributed ledger for this device.

Alternatively, the secret can be a master key KMF memorized in the communication apparatus and also published in the secure distributed ledger. In that case, the master key is used to derive a first hardware diversification key by the communication device and a second hardware diversification key by the authentication server.

The authentication of the communication apparatus can then be carried out using an authentication mechanism based on the use of symmetric keys. A well-known example is the AKA milenage algorithm which is used for authenticating the subscriber in 3GPP-like wireless networks.

According to the example presented in FIG. 2 an algorithm based on the use of symmetric keys is applied. The device authentication 206 can be carried out as follow by the device authentication server 103.

A challenge message is generated by the device authentication server 103 and then transmitted to the communication apparatus 100. The challenge message comprises for example a random number RAND generated by the device authentication server 103.

Then, the device authentication process can be applied 206.

For that purpose, the communication apparatus 100 is able to calculate a first result F_HWRES by applying an algorithm ALGO2 memorized for example in a tamper resistant area of the communication apparatus.

The random number RAND and the first hardware diversification key F_HWDK memorized securely in the communication apparatus or derived from a master key KMF memorized securely in the communication apparatus can be used as inputs:

$$F\_HWRES=ALGO1(F\_HWDK,RAND)$$

This result F_HWRES is then transmitted by the communication apparatus to the device authentication server 103. It is then compared with a result S_HWRES determined by the device authentication server 103.

The result S_HWRES can be determined as follow:

$$S\_HWRES=ALGO2(S\_HWDK,RAND)$$

If 207 the result S_HWRES received from the communication apparatus 100 matches with the one F_HWRES determined by the device authentication server 103, then the communication apparatus 100 is authenticated.

If not, this means that the communication apparatus 100 is not the one known as associated with the subscriber by his home network operator. This situation can be encountered for example when a soft-SIM has been installed in a first communication apparatus, duplicated by a malevolent person and installed in a second communication apparatus. When the second device tries to establish a wireless communication, the home wireless network operator is able to verify if the if the second communication embeds a cloned version of the soft-SIM.

Depending on the success or failure 205 of the authentication, the wireless network can behave differently. Only legitimate communication apparatus with provisioned with the correct hardware diversification key are able to respond correctly. If the authentication is successful, the communication apparatus is identified genuine and therefore, it is granted with an access to the wireless network.

On the contrary, if the authentication process fails, the wireless network operator can then take appropriate actions 208 to cancel the cloned device from its network.

In case of a failed authentication with a genuine device, once the genuine device is identified, the AuC authentication key can be swapped to the current value of this genuine device, in case of AKA tokenization.

Another appropriate action is to force the communication apparatus which is detected as a cloned device to detach from the network, using for example the standardized 3GPP detach procedure.

The invention claimed is:

1. A method for authenticating by a network server a communication apparatus, the communication apparatus comprising a tamper resistant area adapted to memorize a first secret, the network server being configured to communicate with the communication apparatus through a wireless network and to read at least one data element memorized in a secure distributed ledger, wherein the distributed ledger is a database which is consensually replicated, shared, and synchronized geographically across multiple sites, countries, or institutions, the method comprising the steps of:

receiving from the communication apparatus a request message comprising a subscriber identifier;

providing, by consulting a database accessible by the network server, a device identifier associated to the received subscriber identifier allowing to identify the communication apparatus;

identifying in the secure distributed ledger, using the device identifier, a record published by a manufacturer of at least a portion of the communication apparatus, said record comprising a second secret attributed to the identified communication apparatus;

generating a challenge message comprising a random number RAND and sending it to the communication apparatus for it to generate a first result F_HWRES derived from the first secret and the random number RAND, wherein the first secret and the random number RAND are used as inputs;

receiving from the communication apparatus a response message comprising the first result F_HWRES, the communication apparatus being authenticated by the network server if the first result F_HWRES is equal to a second result S_HWRES derived by the network server from the second secret and the random number RAND, which demonstrates that the first secret is equal to the second secret.

2. The method according to claim 1, wherein the subscription identifier is an IMSI.

3. The method according to claim 1, wherein the device identifier is an IMEI.

4. The method according to claim 1, wherein the first secret is a master key that is used to derive a first hardware diversification key F_HWDK.

5. The method according to claim 1, wherein the second secret is a master key KMF memorized in the secure distributed ledger record published by a manufacturer of at least a portion of the communication apparatus.

6. A method according to claim 1, wherein the first and second secret are respectively a first F_HWDK and a second S_HWDK diversification keys.

7. The method according to claim 1, comprising the step of identifying the manufacturer of the electronic circuit using a unique device identifier in order to ease the access to the second hardware diversification key memorized in the secured distributed ledger.

8. The method according to claim 1, wherein the request message is a 3GPP attachment request message comprising an IMSI.

9. The method according to claim 1, comprising the step of identifying the one or several algorithms used for determining the first and second hardware diversification keys, said algorithm being identified or memorized by in the record published by the manufacturer in the secure distributed ledger.

10. The method according to claim 1, wherein the device authentication is triggered once the subscriber operating the communication device is successfully authenticated when another device is already authenticated using the same subscriber identifier.

11. The method according to claim 1, wherein the attempt to authenticate the communication device failed.

12. The method according to claim 1, wherein the database is implemented in the network server.

13. A network server configured to communicate with a communication apparatus through a wireless network adapted to:

receive from the communication apparatus a request message comprising a subscriber identifier;

provide, by consulting a database accessible by the network server, a device identifier associated to the received subscriber identifier allowing to identify the communication apparatus;

identify in a secure distributed ledger, using the device identifier, a record published by a manufacturer of at least a portion of the communication apparatus, said record comprising a second secret attributed to the identified communication apparatus, wherein the distributed ledger is a database which is consensually replicated, shared, and synchronized geographically across multiple sites, countries, or institutions;

generate a challenge message comprising a random number RAND and sending it to the communication apparatus for it to generate a first result F_HWRES derived from the first secret and the random number RAND, wherein the first secret and the random number RAND are used as inputs;

receive from the communication apparatus a response message comprising the first result F_HWRES, the communication apparatus being authenticated by the network server if the first result F_HWRES is equal to a second result S_HWRES derived by the network server from the second secret and the random number RAND, which demonstrates that the first secret is equal to the second secret.

14. The network server according to claim 13 wherein the subscription identifier is an IMSI.

15. The network server according to claim 13, wherein the device identifier is an IMEI.

16. The network server according to claim 13, wherein the first secret is a master key that is used to derive a first hardware diversification key F_HWDK.

17. The network server according to claim 13, wherein the second secret is a master key KMF memorized in the secure distributed ledger record published by a manufacturer of at least a portion of the communication apparatus.

18. The network server according to claim 13, wherein the first and second secret are respectively a first F_HWDK and a second S_HWDK diversification keys.

19. The network server according to claim 13, comprising the step of identifying the manufacturer of the electronic circuit using a unique device identifier in order to ease the access to the second hardware diversification key memorized in the secured distributed ledger.

20. The network server according to claim 13, wherein the request message is a 3GPP attachment request message comprising an IMSI.

21. The network server according to claim 13, comprising the step of identifying the one or several algorithms used for determining the first and second hardware diversification keys, said algorithm being identified or memorized by in the record published by the manufacturer in the secure distributed ledger.

22. The network server according to claim 13, wherein the device authentication is triggered once the subscriber operating the communication device is successfully authenticated when another device is already authenticated using the same subscriber identifier.

23. The network server according to claim 13, wherein the attempt to authenticate the communication device failed.

24. The network server according to claim 13, wherein the database is implemented in the network server.

25. A non-transitory computer memory comprising computer program product comprising instructions which, when the program is executed by a computer, cause the computer to
  receive from the communication apparatus a request message comprising a subscriber identifier;
  provide, by consulting a database accessible by the network server, a device identifier associated to the received subscriber identifier allowing to identify the communication apparatus;
  identify in a secure distributed ledger, using the device identifier, a record published by a manufacturer of at least a portion of the communication apparatus, said record comprising a second secret attributed to the identified communication apparatus, wherein the distributed ledger is a database which is consensually replicated, shared, and synchronized geographically across multiple sites, countries, or institutions;
  generate a challenge message comprising a random number RAND and sending it to the communication apparatus for it to generate a first result F_HWRES derived from the first secret and the random number RAND, wherein the first secret and the random number RAND are used as inputs;
  receive from the communication apparatus a response message comprising the first result F_HWRES, the communication apparatus being authenticated by the network server if the first result F_HWRES is equal to a second result S_HWRES derived by the network server from the second secret and the random number RAND, which demonstrates that the first secret is equal to the second secret.

* * * * *